March 5, 1968 H. W. FULLER 3,372,345

MAGNETIC AMPLIFIER

Filed Feb. 19, 1964

3 Sheets-Sheet 1

INVENTOR.

HARRISON W. FULLER

BY

Philip J McFarland

ATTORNEY

March 5, 1968 H. W. FULLER 3,372,345

MAGNETIC AMPLIFIER

Filed Feb. 19, 1964

3 Sheets-Sheet 2

INVENTOR.
HARRISON W. FULLER
BY
Philip J McFarland
ATTORNEY

MAGNETIC AMPLIFIER

Filed Feb. 19, 1964

INVENTOR.
HARRISON W. FULLER
BY
Philip J McFarland
ATTORNEY

United States Patent Office 3,372,345
Patented Mar. 5, 1968

3,372,345
MAGNETIC AMPLIFIER
Harrison W. Fuller, Needham Heights, Mass., assignor to Laboratory for Electronics, Inc., Boston, Mass., a corporation of Delaware
Filed Feb. 19, 1964, Ser. No. 345,974
5 Claims. (Cl. 330—63)

ABSTRACT OF THE DISCLOSURE

A magnetic amplifier including an anisotropic magnetic thin film having an easy axis of magnetization. A rotating magnetic field applied at one end of the film generates a succession of magnetic domains, alternate ones being magnetized in opposite directions. An electrical signal applied to electrodes at the other end of the film generates a restraining magnetic field thereby slowing down propagation of the magnetized domains along the film. Varying the electrical signal applied to these electrodes, varies the amount of magnetic energy passing along the film and a pick-up transducer sensing the magnetic field from the film converts it into an electrical output signal which varies in proportion to the variable signal applied to the restraining electrodes.

This invention relates generally to apparatus and method of amplifying an electric signal and particularly to apparatus and method of such type in which amplification is accomplished in a magnetic amplifier.

So-called magnetic amplifiers have been known for many years and have been used widely to advantage, especially when relatively large amounts of power are involved. However, in spite of the many advantages of known magnetic amplifiers, as their extreme ruggedness and ability to handle large amounts of power, electron tube and transistor amplifiers, are far more commonly used. Among the factors militating against the more popular use of magnetic amplifiers are their large size and weight, their slow response and their limited bandwidth. Thus, it has heretofore been more economical, or even necessary, in many applications to use electron tube or transistor amplifiers in preference to magnetic amplifiers.

It is, therefore, a primary object of this invention to provide an improved magnetic amplifier whose operational characteristics approach, or equal, the operational characteristics of electron tube or transistor amplifiers.

Another object of the invention is to provide an improved magnetic amplifier which is both lighter and more compact than known magnetic amplifiers.

Still another object of the invention is to provide an improved method for amplifying electric signals.

Figure 1:
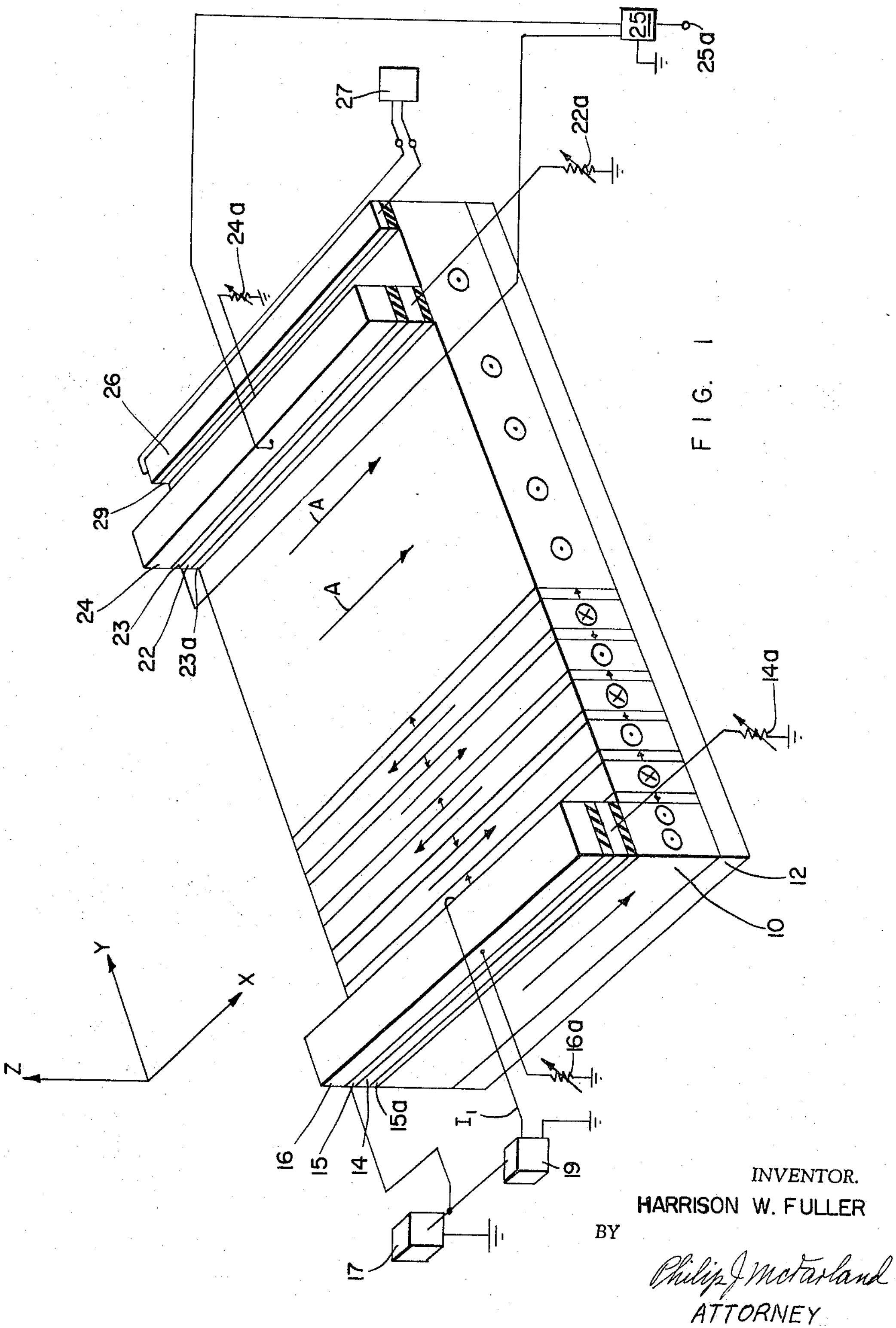
Figure 2:
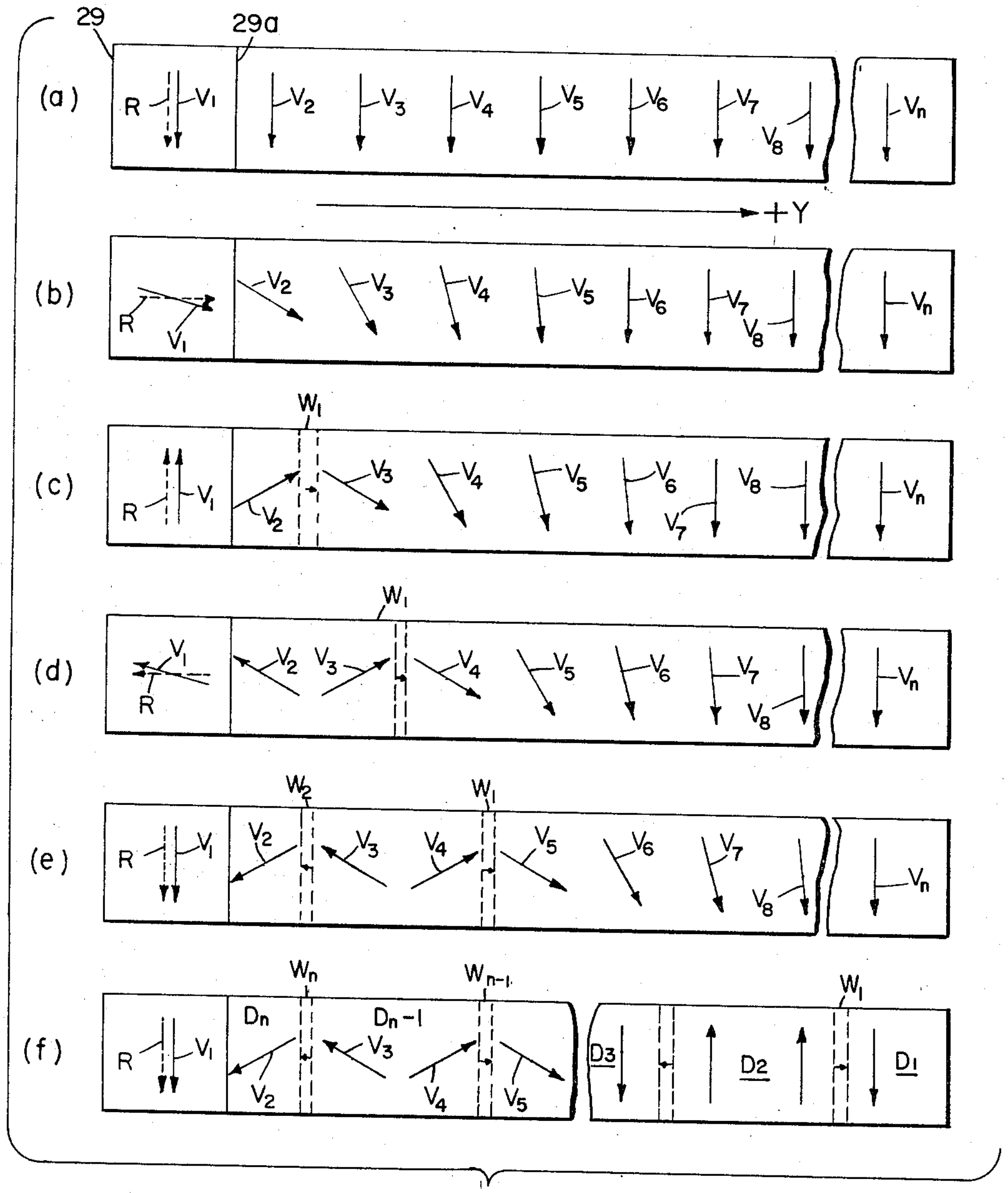
Figure 3:
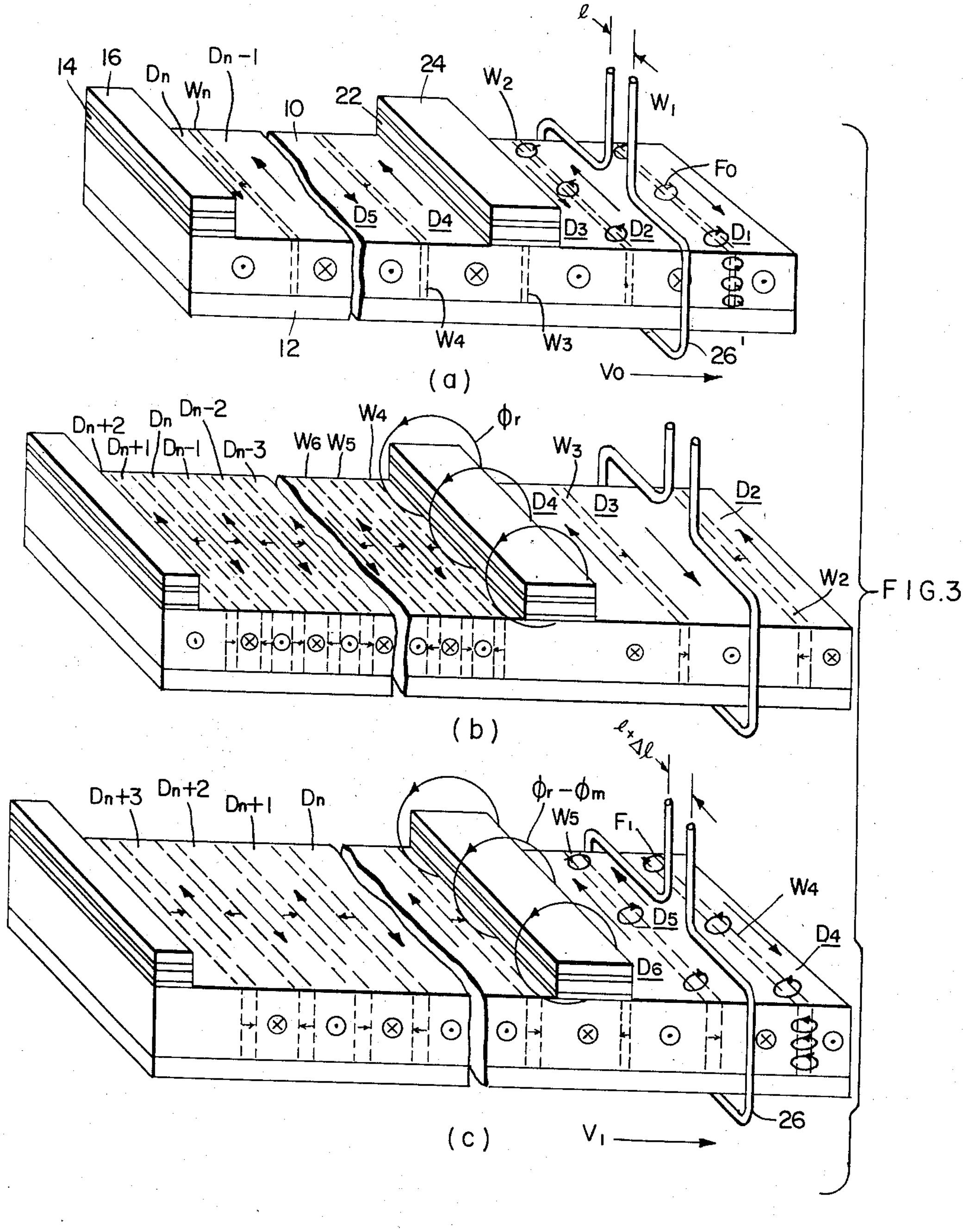

For a more complete understanding of the invention reference is now made to the following detailed description of a preferred embodiment of the invention and to the accompanying drawings, in which:

FIG. 1 is a greatly simplified, partially isometric and partially schematic, view of a magnetic amplifier according to the invention, portions of the illustrated amplifier being greatly enlarged and distorted the better to show the novel aspects of the invention;

FIGS. 2(*a*) through (*e*) are idealized plan views of the magnetic medium of FIG. 1 showing the manner in which oppositely oriented domains and their associated domain walls are generated and propagated in such medium; and, FIGS. 3(*a*), 3(*b*) and 3(*c*) are idealized sketches illustrating successive steps in the operation of the amplifier shown in FIG. 1.

Referring now to FIG. 1 it may be seen that a film of a ferromagnetic material, as "Permalloy" (83% nickel–17% iron) is supported on a non-magnetic base 12, as a sheet of glass. The film 10 preferably is deposited on the base 12 by known vacuum deposition techniques to a thickness of between 100 and 10,000 angstroms in a steady magnetic field. Under such conditions it is known that the easy direction of magnetization of the film 10 may be set substantially parallel to "X" coordinate of the coordinate system shown at the upper left portion of FIG. 1.

Domain forming electrodes 14, 16, fabricated from any electrically conductive non-magnetic material, are fixed, as by cementing, parallel to the X coordinate and adjacent to the left hand side of film 10. The domain forming electrodes are separated from the film 10 (and from each other) by electrically insulating spacers 15, 15*a*, as shown. Domain forming electrode 14 is connected in series with a variable resistor 14*a* across the output of any known alternating current source 17. Preferably the alternating current source 17 is of the type which produces a sinusoidal waveform output. Domain forming electrode 16 is connected in series with a variable resistor 16*a* across the output of a phase shifter 19, as a known capacitor-resistor network. The latter element in turn is energized by the alternating current source 17. The output waveform of the phase shifter 19 may be shifted substantially 90° from the phase of its input (and the same amount from the phase of the output of the alternating current source 17).

Restraining field electrodes 22, 24 are fixed, again as by cementing, to the film 10 parallel to the X coordinate and spaced from the domain forming electrodes 14, 16 along the length of film 10. The restraining field electrodes 22, 24 are separated from the film 10 (and from each other) by electrically insulating spacers 23, 23*a*. Restraining field electrode 22 (in series with a variable resistor 22*a*) and restraining field electrode 24 (in series with a variable resistor 24*a*) are connected to the output of a current source 25, as shown. The latter element, in turn, is controlled by an electric signal to be amplified (not shown) applied through an input terminal 25*a*. It should be noted, in passing, that the nature of the input signal applied to terminal 25*a* is not critical. That is, the input signal to terminal 25*a* may be either a digital or an analog signal. Further, it should also be noted that the current source 25 may take any one of many known forms. For example, current source 25 may be a DC source, in which case it may be possible to disconnect restraining field electrode 24 or to eliminate that electrode along with variable resistor 24*a*. An output, or pickup, loop 26 is magnetically coupled to the film 10 adjacent to the right hand side thereof, the plane of the output loop 26 in the illustrated case being substantially parallel to the X–Z plane of the coordinate system of FIG. 1. The output loop 26 obviously is fabricated from a non-magnetic electrical conductor and is properly insulated by spacer 25. The output loop 26 is connected to a utilization circuit 27, which may take any one of many known forms, depending upon the nature of the signal to be amplified.

The operation of the embodiment of the invention illustrated in FIG. 1 may best be explained by referring to FIG. 2 and FIG. 3(*a*) (*b*) (*c*) along with FIG. 1. Initially, as noted hereinbefore, the film 10 is magnetized as indicated by the arrows A in FIG. 1. When the alternating current source 17 is energized, separate currents flow through domain forming electrodes 14 and 16, setting up separate time-varying magnetic fields around each such electrode. At any given point within the two time-varying magnetic fields, however, such magnetic fields combine to produce a resultant field R. The 90° phase difference between the currents setting up the individual magnetic fields, together with the direction of current flow through the domain forming electrodes 14, 16 in the illustrated case, cause the resultant field R to rotate at an angular speed which is directly proportional to the frequency of the alternating current source 17 in the X–Y plane of the coordinate system shown in FIG. 1. In addition, by properly proportioning the maximum values of the individual magnetic fields of the domain forming electrodes 14, 16 the magnitude of the resultant field R may be adjusted as desired for most efficient operation as described immediately hereinafter. The variable resistors 14*a*, 16*a*, of course, provide a simple means to attain the desired proportioning of the magnetic fields.

Referring now to FIG. 2 in particular, it is seen that the resultant field R around the domain forming electrodes 14, 16 may be represented to have effective limits along the film 10 designated by the numerals 29, 29*a*. The magnetization vectors in the film may be represented by solid arrows $V_1$ through $V_n$. For ease of explanation it is assumed that the resultant field R is, again as noted hereinbefore, initially aligned parallel to the easy direction of magnetization of the film 10 (or parallel to the X coordinate of the coordinate system shown in FIG. 1). As the resultant field R rotates, say in a counterclockwise direction, the magnetization of the portion of the film 10 within the effective limits of the resultant field R also rotates, as shown by the solid arrow $V_1$, in FIGS. 2(*b*) through (*f*). It will be noted that exact "tracking" of the solid arrow $V_1$ with the resultant field R need not take place. Slight lagging is, however, of little or no moment, provided only that rotation of the resultant field R through an angle of 180° reverses the direction of magnetization of the portion of the film 10 within the effective limits of the resultant field R.

It is known that rotation of a single one, or of a group of magnetization vectors in an aligned magnetic medium is reflected in rotation, of like sense but smaller amount, of other magnetization vectors in such a medium. Consequently, rotation of the magnetization vector represented by the solid arrow $V_1$ is accompanied by rotation of the magnetization vectors represented by the arrows $V_2$, $V_3$ . . . $V_n$ in the manner shown. Thus, as may be seen in FIGS. 2(*a*) through 2(*e*), rotation of the resultant field R through 360° in the plane of the paper causes successive magnetization vectors $V_2$, $V_3$ . . . $V_n$ to rotate until, as shown in FIG. 2(*e*), three domains $D_1$, $D_2$, $D_3$ are formed. Since it is not possible that discontinuities exist in the magnetic field between domains, domain walls $W_1$, $W_2$ are created concurrently with the formation of the domains. The magnetization vectors of the domain walls $W_1$, $W_2$ lie in the same plane as the magnetization vectors of the domains $D_1$, $D_2$, $D_3$. This means, of course, that "Néel walls" are formed. Since successive domain walls $W_1$, $W_2$ (which may be considered to be magnetic dipoles) are magnetized in opposite directions, a repulsion force exists between the two. However, since domain wall $W_2$ cannot move to the left against resultant field R, the net effect of such repulsion force is to force domain wall $W_1$ to move to the right. As the domain walls $W_1$, $W_2$ move to the right, the magnetic field associated with each wall in turn rotates successive portions of the film 10 to form the illustrated domains. Further the creation of the third domain wall $W_3$ by further rotation of the resultant field R forces domain wall $W_2$ to move to the right and, at the same time, keeps domain wall $W_1$ moving.

After *n* revolutions of the resultant field R, the situation illustrated in FIG. 2(*f*) obtains. That is, an equilibrium condition is attained wherein a plurality of domains $D_1$ . . . $D_n$ exists, each such domain being separated from each other by domain walls $W_1$ . . . $W_{n-1}$. In such condition the domains and domain walls (together with the fringe fields associated with each domain and domain wall, one of which fields is indicated in FIG. 3(*a*) at $F_0$) move toward the right at a constant velocity $V_0$ and the magnetic energy in the film 10 is a constant. This condition will be referred to hereinafter as the "normal equilibrium" condition.

Referring now to FIGS. 3(*a*), 3(*b*) and 3(*c*) the manner in which magnetic energy in the film 10 may be varied to accomplish the desired amplification of electric signals is illustrated. Before discussing FIGS. 3(*a*), (*b*) and 3(*c*), however, it should be noted that the method of indicating the magnetization vectors of domains has been simplified in FIG. 3 as compared to FIG. 2. Further, it should be noted that the energizing means for the domain forming electrodes 14, 16 and the restraining field electrodes 22, 24 and the utilization circuit 27 have been omitted from FIG. 3, it being deemed obvious that the corresponding elements shown in FIG. 1 may be used.

FIG. 3(*a*) is, as may be seen after a short inspection, very similar to FIG. 2(*f*). That is, FIG. 3(*a*) shows the normal equilibrium condition attained in the film 10 with the restraining electrodes 22, 24 deenergized so that no restraining field is applied. The domains are shown moving at their normal equilibrium velocity from left to right through the film 10. The fringe field $F_0$ of the domain walls therefore links the horizontal portions of the output loop 26 to generate a voltage $e_0$ across the output thereof.

When, as shown in FIG. 3(*b*), a restraining field $\phi_r$ is generated by appropriately energizing the restraining electrodes 22, 24, the next approaching domain wall, here labelled $W_4$, moves into a portion of the film 10 whose magnetization is affected by the field $\phi_r$. A moment's thought will make it clear that the magnitude of the current through such electrodes may be made great enough that the approaching domain wall $W_4$ cannot rotate the magnetization vectors in the film 10 within the limits of the restraining field $\phi_r$. Under such a condition further movement of the domain wall $W_4$ to the right is not possible. Since, however, new domains and domain walls are being continuously generated and propagated by the action of the domain forming electrodes 14, 16 as described hereinbefore, more and more domains and domain walls are formed in the film 10 between the restraining electrodes 22, 24 and the domain forming electrodes 14, 16, thus increasing the energy stored in that portion of the film 10. There is, of course, a limit to the density of domains which can be packed into any magnetic medium such as the film 10. In practice, any one of the three following effects may limit the density of the domains in the film 10:

(a) "Slippage" at the domain forming electrodes 14, 16, or adjacent thereto, when the resultant field R is not strong enough to form oppositely magnetized domains in the film;

(b) "Leakage" when the restraining field $\phi_r$ is not strong enough to stop movement of the domains; and, (c) "Annihilation" of certain domains and their associated walls when both the resultant field R and the restraining field $\phi_r$ are extremely large (so as to obviate either "slippage" or "leakage") and the magnetization of certain domains reverses spontaneously.

In any event, however, it may be seen that there is an equilibrium condition (for a given resulting field R, restraining field $\phi_r$ and film 10) in which the density of the domains in the portion of the film 10 between the resulting field R and the restraining field $\phi_r$ is a maximum. In such an equilibrium condition (hereinafter referred to as the "restrained equilibrium" condition) a maximum amount of magnetic energy may be considered to be "stored" in the film 10.

Assuming that FIG. 3(*b*) represents the restrained equilibrium condition, it becomes evident that if, as shown in FIG. 3(*c*), the restraining field $\phi_r$ is reduced to a value $\phi_r - \phi_m$ (where $\phi_m$ represents the field resulting from the change in current through the restraining electrodes 22, 24 due to application of a control signal to terminal 25*a* of current source 25 as described hereinbefore) movement of the domains to the right is reinitiated. The fringe field $F_D$ of the successive domain walls will then link the output loop 26, each such field inducing a voltage $\pm(e_0+e)$ in the output loop 26, the polarity of the voltage induced by each domain wall depending on the direction of the fringe field of each. It will be observed that $V_1 > V_0$, where $V_1$ equals the velocity of the domains and walls upon reduction of the restraining field. This follows from the fact that a greater repulsion force exists between the domain walls when the density of the domains is increased over their normal equilibrium value and the fact that, as noted hereinbefore, only a fixed maximum number of domains and walls may, absent a restraining field, exist in the magnetic film 10. In other words, it may be considered that, since the domain and domain wall density of the portion of the film 10 to the right of the modulated restraining field $\phi_r - \phi_m$ in FIG. 3(*c*) perforce may not be substantially different from that shown in FIG. 3(*a*), velocity $V_1$ must be greater than velocity $V_0$. It is evident that once the restrained equilibrium condition shown in FIG. 2(*b*) is attained, even the smallest reduction in the restraining field $\phi_r$ by a field $\phi_m$ allows movement of domains and domain walls to produce the voltage $\pm(e_0+e)$ with an attendant amplification of the electric signal which causes such field $\phi_m$. In the illustrated case, the output electric signal (or the voltage across the terminals of the output loop 26) is an AC signal. It is obvious, however, that such a signal may be rectified if desired to provide a unipolar signal of the same or opposite polarity to the signal causing the field $\phi_m$.

FIGS. 2 and 3 exemplify also the method contemplated by the invention. Thus it may be seen that the contemplated method may be considered on the one hand to consist of the steps of: propagating, at a velocity greater than a normal equilibrium velocity, successive magnetic domains in a magnetic medium, as film 10; modulating the velocity of such magnetic domains in accordance with an electric signal to be amplified; and, translating the effect of such changes in velocity to an output electric signal, the peak amplitude of such signal (either positive or negative) being proportional to the input signal. It will be noted here that the method contemplated by the invention is not restricted to a method in which movement of domains past a restraining field is completely stopped. That is, the restraining field need only vary the velocity of the domains and their associated walls in accordance with the instantaneous strength of a restraining field, which strength in turn may be proportional to an analog signal. In addition it should be noted that the restrained equilibrium condition need not be attained. That is, so long as the restraining field retards the movement of the domains to any appreciable degree, both the method and apparatus discussed hereinbefore will be operative. It is evident, however, that if maximum amplification of an input signal is to be attained, the restrained equilibrium condition should be attained.

Alternatively, the contemplated method may be considered from an energy point of view. That is, the contemplated method may be considered to consist of the steps of forcing a magnetic film to contain an excess of magnetic energy over the amount of energy such a film may ordinarily contain; releasing a part of such excess energy in accordance with a control signal; and, translating the effect of such released energy into an electric signal.

Those skilled in the art will recognize that the apparatus described hereinbefore is not the only apparatus adapted to carry out the contemplated method. As a matter of fact, almost every element of the magnetic amplifier illustrated in FIG. 1 may be changed without departing from the concepts of the method just described. For example, the film 10 need only be an anisotropic magnetic medium. This means that a cast or sintered magnetic material of orders of thickness greater than the described film may be used. The domain forming electrodes 14, 16 and the circuitry for energizing them may be replaced by the wall forming electrodes and energizing means therefor shown and described in my copending application, Ser. No. 697,-058 filed Nov. 18, 1957, and entitled High Capacity Data Processing Techniques (which application is assigned to the same assignee as this application). That is, a time and space varying field may be applied to a magnetic medium to generate successive domain walls of the "Bloch" type without departing from the concepts of the invention. The modulation of the restraining field need not be accomplished as shown but rather may be accomplished by rotating the direction of the restraining field so that it has a lesser or greater effect on the movement of the domains in a magnetic medium. Even the position of the output loop and its configuration may be changed. For example, a properly shaped and oriented output loop may be disposed in the restraining field itself so as to take advantage of the energy changes occurring there. Finally, it is not always necessary to provide electrical insulating spacers 15*a*, 23*a* and 29. These spacers are necessary only when excessive atomic diffusion occurs between the film 10 and the various elements separated therefrom by the spacers.

The advantages to be gained from the use of the invention will now be manifest. In the first place, since only a thin film of magnetic material need be used, it is evident that a very light and compact magnetic amplifier may be made. Further, the operational characteristics of the disclosed magnetic amplifier, such as bandwidth and speed of response, are far less limited than known magnetic amplifiers. In fact, the operational characteristics of the disclosed amplifier approach the characteristics of high performance electron tube or transistor amplifiers. In this connection it should be noted the disclosed amplifier is in some respects superior to electron tube or transistor amplifiers. Thus, if it is desired to amplify a single randomly occurring pulse, it is a simple matter to put the magnetic medium in its restrained equilibrium condition and leave it for extended periods of time (taking advantage of the storage ability of a magnetic medium) without fear that the amplifier will not be capable of almost instantaneous response to a pulse to be amplified. The disclosed amplifier is also adapted to amplitude discrimination so that it will amplify only those pulses above a certain level. That is, if the restraining field is made somewhat larger than required to stop propagation of domains through the film, obviously only those input pulses or signals above a threshold size will reduce the magnitude of the restraining field enough to allow domains and their associated domain walls to move to produce an output signal.

In view of the foregoing description of the invention and the obvious and numerous modifications which may be made by those skilled in the art of magnetic amplifiers without departing from the teachings of the invention, it is felt that the invention should not be restricted to its disclosed embodiments, but rather should be limited only by the spirit and scope of the appended claims.

What is claimed is:

1. Apparatus for amplifying an electrical signal comprising, an anisotropic magnetic medium, first means applying a varying magnetic field to a first section of said medium to continuously create a sequence of magnetic domains separated by interdomain walls and to propagate said sequence in a first direction within said magnetic medium, alternate ones of said domains being oppositely magnetized, second means impressing a restraining magnetic field on a second portion of said medium displaced from said first portion in said first direction, the direction of said restraining magnetic field being such that it restrains the propagation of said domains in said first direction, thereby increasing the number of domains within said medium between said first and second portion, control means coupled to said second means and responsive to said electric signal to be amplified to vary the magnitude of the magnetic field applied to said second portion in response to variations in said electric signal thereby varying the restraining effect on propagation of said domains in said first direction, and sensing means positioned to sense the magnetic field emanating from domains propagating through said second portion of said medium, said sensing means producing an electrical signal which varies with variations in said sensed magnetic field.

2. An apparatus in accordance with claim 1 wherein said anisotropic magnetic medium is an elongated film having its easy axis of magnetization oriented substantially perpendicular to its longitudinal axis and wherein said first means for applying a varying magnetic field is positioned at one end of said film and said domains are propagated along the longitudinal axis of said film.

3. Apparatus in accordance with claim 2 wherein said first means for applying a varying magnetic field includes a plurality of thin non-magnetic conductors and wherein said second means for impressing a restraining magnetic field includes at least one thin non-magnetic conductor, the walls between said magnetic domains being of the Nèel type and all of said conductors being arranged to generate magnetic fields in the plane of said magnetic film.

4. Apparatus in accordance with claim 2 wherein said first means for applying a varying magnetic field includes a thin non-magnetic conductor arranged to generate a magnetic field in the plane of said magnetic film and a core for producing a magnetic field normal to the plane of said magnetic film, the walls between said domains being of the Bloch type.

5. Apparatus for increasing the density of magnetic domains and interdomain walls in an anisotropic magnetic medium comprising, first means for applying a varying magnetic field to a first portion of said medium to continuously create a sequence of magnetic domains separated by interdomain walls and to propagate said sequence in a first direction within said magnetic medium, alternate ones of said domains being oppositely magnetized, and second means for impressing a second magnetic field on a second portion of said medium displaced from said first portion in said first direction, and magnitude and direction of said second field being such that it restrains propagation of said domains and interdomain walls in said first direction, said first means for creating and propagating said domains continuing to operate when said second field is impressed thereby causing an increase in the density of the domains and interdomain walls within said magnetic medium.

References Cited

UNITED STATES PATENTS

| | | | |
|---|---|---|---|
| 3,092,813 | 6/1963 | Broadbent | 340—174 X |
| 3,176,276 | 3/1965 | Smith | 340—174 X |
| 3,193,692 | 7/1965 | Davis et al. | 340—174 X |
| 3,230,515 | 1/1966 | Smaller | 340—174 X |

ROY LAKE, *Primary Examiner.*

NATHAN KAUFMAN, *Examiner.*